United States Patent

[11] 3,588,518

| [72] | Inventor | Andre Wavre |
| | | Monroeville, Pa. |
| [21] | Appl. No. | 798,911 |
| [22] | Filed | Feb. 13, 1969 |
| [45] | Patented | June 28, 1971 |
| [73] | Assignee | Westinghouse Electric Corporation |
| | | Pittsburgh, Pa. |

[54] POWER MULTIPLEXING SYSTEM
12 Claims, 7 Drawing Figs.

[52] U.S. Cl. .................................................... 307/38
[51] Int. Cl. .................................................... H02j 3/14
[50] Field of Search .................................................... 307/38, 39,
40, 41, 31, 11, 32, 35; 329/104 (Inquired);
340/248 (Inquried); 310/14 (Inquired); 328/75,
106; 317/139

[56] References Cited
UNITED STATES PATENTS

| 3,153,728 | 10/1964 | Procter .......................... | 307/31 |
| 3,337,741 | 8/1967 | Mislan .......................... | 307/41 |

*Primary Examiner*—Robert K. Schaefer
*Assistant Examiner*—H. J. Hohauser
*Attorneys*—A. T. Stratton, Z. L. Dermer and J. William Wigert, Jr.

ABSTRACT: A system is disclosed for providing a plurality of groups of load elements with direct current from a three-phase power source according to a predetermined current value sequence. Rectification and regulation of the current from the three-phase power source is provided by a novel solid-state power unit. In order to reduce the number of such rectifying power units, controlled switching devices are utilized for multiplexing the outputs from the rectifying power units such that more than one group of load elements is energized by a single power unit. Alarm protection means provides an alarm signal in the event that more than one such group of load elements is energized at any given time from a given power unit.

| | INPUT 253 | INPUT 255 | SWITCH 181 | SWITCH 213 | INHIBIT PROTECTION ALARM GROUP I | INHIBIT PROTECTION ALARM GROUP II | INHIBIT PROTECTION ALARM GROUP III | ENERGIZE STATIONARY COILS 12 | ENERGIZE STATIONARY COILS 14 | ENERGIZE STATIONARY COILS 16 |
|---|---|---|---|---|---|---|---|---|---|---|
| MOVE GROUP I | 1 | 0 | 1 | 0 | 1 | 0 | 0 | 0 | 1 | 1 |
| MOVE GROUP II | 0 | 1 | 0 | 1 | 0 | 1 | 0 | 1 | 0 | 1 |
| MOVE GROUP III | 0 | 0 | 0 | 0 | 0 | 0 | 1 | 1 | 1 | 0 |

FIG. 6B.

POWER MULTIPLEXING SYSTEM

CROSS REFERENCES TO RELATED APPLICATIONS

The present invention is related to the invention covered by copending application Ser. No. 798,912, filing date Feb. 13, 1969, entitled "Power Multiplexing System" by Andre Wavre; copending Pat. application Ser. No. 798,913, filing date Feb. 13, 1969, entitled "Signal Sequencing System," by Andre Wavre and Dean Santis; both of which are assigned to the assignee of the present invention and filed concurrently herewith.

BACKGROUND OF THE INVENTION

The invention relates to a novel solid-state multiplex system to provide a multilevel direct current sequence to a plurality of groups of load elements from a three-phase power source.

In the above-mentioned copending patent application by Wavre, Ser. No. 798,912, a solid-state system is disclosed for converting current from a three-phase power source into direct current to be fed to a plurality of load elements. The value of the current is regulated according to a predetermined current reference source, the reference source being supplied by a predetermined wired logic unit. Such a system is particularly useful in a nuclear reactor, and more particularly to a nuclear reactor rod control system comprising a large number of control rods which are incrementally inserted or withdrawn from the nuclear reactor to vary the power output of the reactor. The term "control rod" or "rod" in the context of this invention is taken to include any rod inserted or withdrawn from a nuclear reactor, even rods which are not directly used for normal control functions. The rods are incrementally stepped by a three coil jack mechanism per se well known to persons skilled in this particular art. One such device is disclosed in U.S. Pat. No. 3,158,766 by E. Frisch. Each of the coils must be provided with a particular direct current sequence which is described in more detail in the related above-mentioned and copending patent application, Ser. No. 798,912.

In the nuclear art, for example, one power supply unit is presently required for four jack mechanisms. Since a typical nuclear reactor may have 50 or more control rods which are subdivided in banks and typically in groups of from one to four jack mechanisms per group, a considerable number of power units is required per plant. Since only a limited number of groups can operate simultaneously, equipment is idling much of the time and hence is not being used very efficiently. The cost can be considerably reduced by using the same power supply unit for more than one group where the groups are not operating simultaneously. Because of the expense of the equipment involved, particularly in the case of a solid-state power unit as described in the above-mentioned and related copending Pat. application Ser. No. 798,912, elimination would not only reduce the cost of the overall system but would also increase the reliability of the system due to the reduced number of parts.

SUMMARY OF THE INVENTION

It is therefore an object of the present invention to provide an improved multiplexing scheme for providing direct current according to a predetermined multiload current value sequence to groups of load elements requiring substantially the same current requirements.

Another object of the present invention is to provide an improved multiplexing scheme which is both inexpensive and reliable.

Another object of the present invention is to provide an improved scheme for providing direct current according to a predetermined reference current signal to a plurality of groups of load elements wherein it is possible to utilize fewer power units to supply said direct current than used previously.

It is further an object of the present invention to provide an improved highly efficient signal multiplexing scheme for multiplexing direct current to a plurality of groups of load elements wherein highly efficient and reliable solid-state controlled switching devices are utilized.

Still another object of the present invention is to provide an improved multiplexing scheme for supplying direct current to a plurality of groups of load elements and including protection alarm circuits for providing alarm signals in the event of a failure of the multiplexing system.

Briefly, the present invention includes the use of controlled switching devices, commonly referred to as SCRs, for multiplexing the direct current provided by each of a plurality of power units to pluralities of groups of load elements, wherein each group within the plurality of groups of load elements has substantially identical current value requirements. Only a single reference current source is therefore required rather than the necessity of providing a reference current source for each group of load elements utilizing a single power unit. Means are provided for switching the controlled switching elements so that only one group of load elements is energized at a time. Further, in order to avoid the possibility of having more than one group of load elements energized by a single power unit at one time, protection means provide an alarm signal in the event that more than one group of elements is activated.

DESCRIPTION

Figure 1:
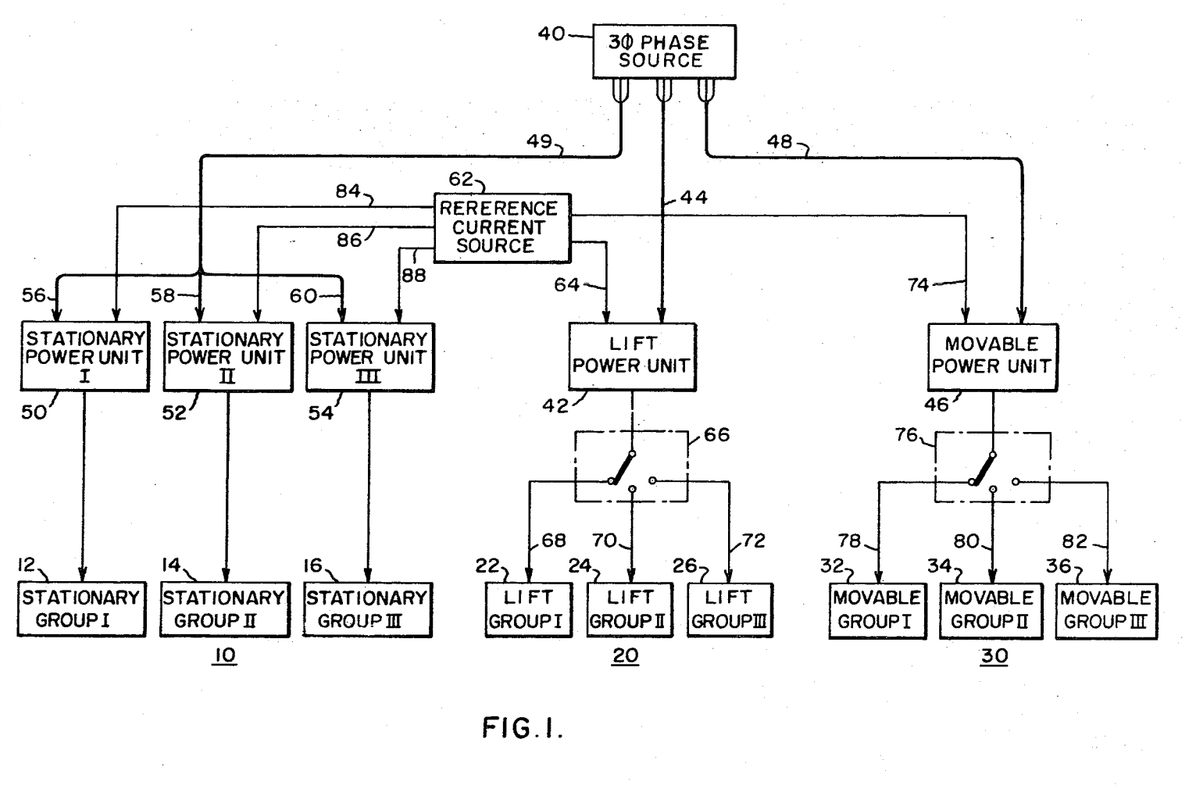
FIG. 1 is a block diagram of the novel multiplexing system incorporating the present invention.

FIG. 1 shows three sets of load elements, each comprising three groups of load elements shown generally as 10, 20 and 30, the first set of load elements 10 comprising a first group 12, a second group 14 and a third group 16. Groups 12, 14 and 16 all require identical multilevel direct current sequence but may not be multiplexed for reasons explained subsequently. The second set of load elements 20 is comprised of a first group of load elements 22, a second group 24 and a third group 26. Again, all of the load elements within each of these three groups have the same current requirements but at different time intervals. The final set of load elements 30 has a first group of load elements 32, a second group 34, and a third group 36. Again, each group of load elements requires the same current sequence to be fed through each, but the current requirement must be met at totally different time intervals, i.e., only one such group is energized at any particular time. It should be understood, however, that the present invention should not be limited to its utilization with only three sets of load elements, 10, 20 and 30, and three groups per set as shown. The particular arrangement shown has been given for purposes of illustration only.

The load elements 10, 20 and 30, may, for example, represent the three types of coils found in the jack mechanisms used to insert and withdraw control rods in a nuclear reactor. For example, the load elements 10 may, in the specific example of a nuclear rod control system, be groups of stationary coils for a plurality of jack mechanisms. Groups 12, 14 and 16, may each be a group of stationary coils, groups 22, 24 and 26 may each be a group of lift coils and groups 32, 34 and 36 may each be the movable coils for corresponding pluralities of jack mechanisms in a nuclear reactor rod control system. In the particular arrangement shown in FIG. 1, a total of three groups of controls rods may be operated, but at different times. Thus the first group of control rods are operated by the first group of stationary coils 12, the first group of lift coils 22, and the first group of movable coils 32 corresponding to one group of jack mechanisms. The second group of control rods are operated by a second group of jack mechanisms comprising coils 14, 24 and 34 and the third group by coils 16, 26 and 36. The sequence for withdrawing, for example, the first group of control rods one incremental step is as follows. First each of the movable coils 32 are energized, then the first group of stationary coils 12 are deenergized, and finally the lift coils 22 are energized thereby withdrawing the first group of control rods one increment. After this incremental raise, the group of stationary coils 12 are then energized again to hold the control rods at their new raised position, and then the lift coils 21 and movable coils 32 are deenergized. When it is desired to raise the second group of control rods through operation of stationary coils 14, lift coils 24, and movable coils 34, a similar sequence is carried out. This same procedure is followed when the third group of control rods are inserted or withdrawn, i.e., when the third groups of jack mechanism coils are sequenced, stationary coil 16, lift coils 26 and movable coils 36.

Three-phase power is supplied by power source 40 to a plurality of direct current power units or rectifier regulators. These rectifier regulators, which are described in detail in the above-mentioned Pat. application, Ser. No. 798,912, provide direct current outputs at predetermined multivalue levels. Power unit 42 receives three-phase current from the power source 40 through lines shown figuratively as single line 44. Where the present invention is embodied in a nuclear reactor rod control system, power unit 42 corresponds to the power unit to provide a direct current sequence to pluralities of lift coils. A second output from the three-phase power source 40 is provided to a second power unit 46 via line 48. Again, referring to the specific embodiment of a nuclear reactor rod control system, the second power unit corresponds to the power unit to provide the direct current sequence to the movable coils of a plurality of jack mechanisms. A third output 49 is also shown from the three-phase power source 40. Three-phase power is provided from output line 49 to three separate power units 50, 52 and 54 via lines 56, 58 and 60 respectively. The reason for separate power units for the respective groups of load elements 12, 14 and 16 will be described subsequently with regard to the specific embodiment of a nuclear reactor rod control system.

Direct current is provided from each of the power units to the various groups of illustrated load elements, according to the reference current signals provided by reference current source 62. Reference current source 62 provides a first reference current signal via line 64 to the first power unit 42. The reference current source 62 is described in more detail in the above-mentioned copending Pat. application, Ser. No. 798,912 in conjunction with the operation of the various power units. Hence only the following brief description will be given regarding the interrelationship between the reference current source 62 and the various power units.

The first reference signal is used to regulate the direct current output from the first power unit or, with regard to the specific embodiment of a nuclear rod control reactor system, lift coil power unit 42. The output from the first power unit is then multiplexed, as shown figuratively by multiplexing means 66, such that the direct current from the power unit 42 may be directed to one of the first group 22 of load elements via line 68, the second group 24 via line 70, or the third group 26 via line 72. Similarly, a second reference signal is provided via line 74 to the second power unit 46, which, in the case of a nuclear rod control system is the power unit for the movable coils of a plurality of jack mechanisms, to provide a direct current output which is provided to a second multiplexing means 76 to provide direct current according to the signal from the reference current source 62, to one of the first group of elements 32 via line 78, the second group of load elements 34 via line 80, or the third group of elements 36 via line 82.

In a nuclear reactor rod control system, the reference current source 62 provides three separate reference current signals via lines 84, 86 and 88 to stationary coil power units 50, 52 and 54, respectively, for reasons given in more detail subsequently.

Figure 2:
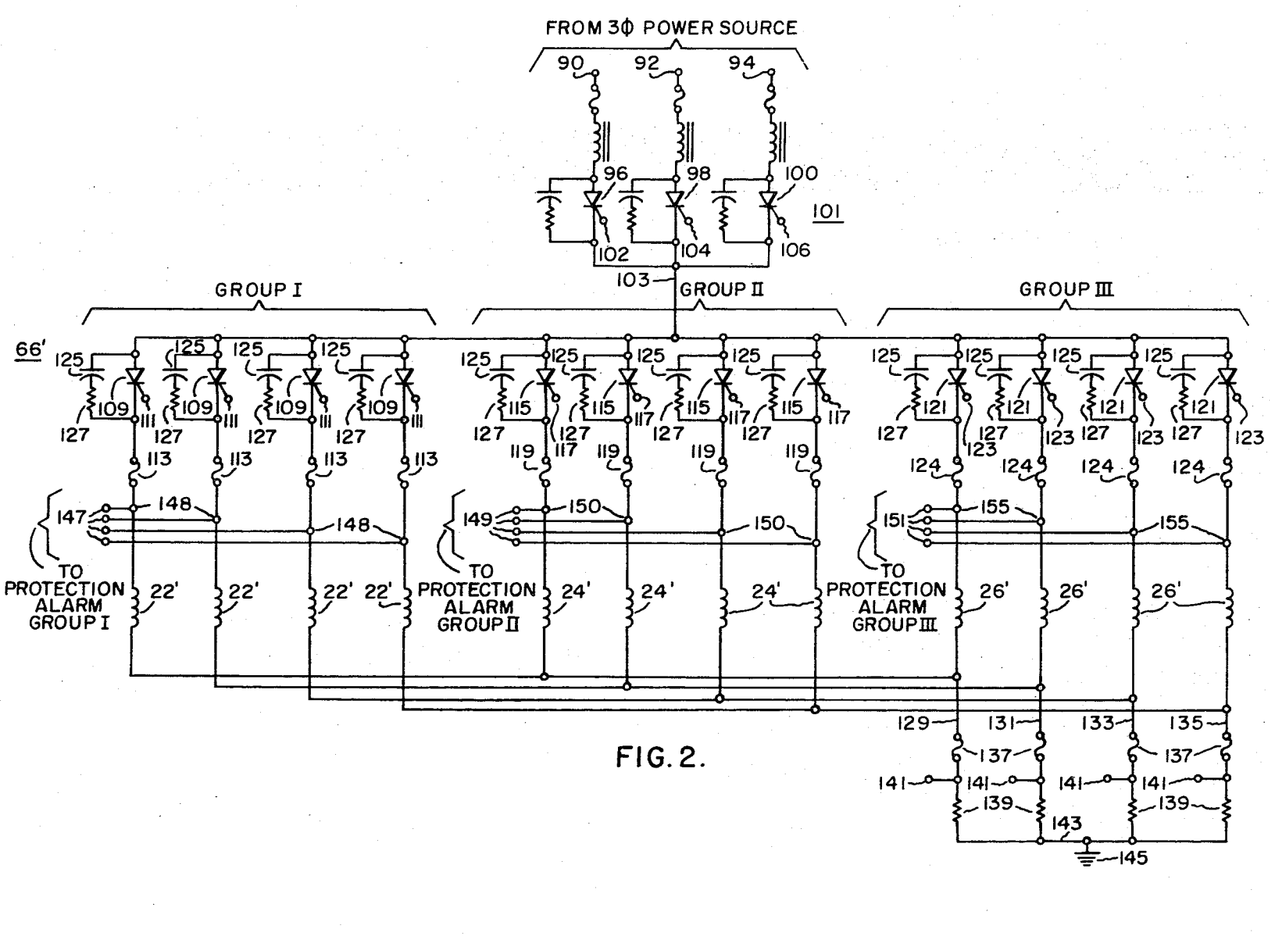
FIG. 2 is a schematic diagram illustrating in more detail one of the multiplexing arrangements shown in FIG. 1.

FIG. 2 illustrates multiplexing means 66 for the load elements in groups 22, 24 and 26 corresponding to the lift coils in a plurality of controlled jack mechanisms. Three-phase current is provided at input terminals 90, 92 and 94 of a current rectification and regulation power unit 101 comprising controlled switching devices 96, 98 and 100 having gate inputs 102, 104 and 106. These switching devices desirably are thyristors or their equivalents. The output from this three thyristor power unit is a DC signal through line 103 having current values according to the reference current source 62 which is operable to control the SCRs 96, 98 and 100 by signals provided at their respective inputs 102, 104 and 106. It should be noted, however, that the aforesaid description of the power unit 101 is in itself a novel design, forms a part of, and is described in more detail in the above mentioned copending Pat. application Ser. No. 798,912.

Three groups of four load elements per group are shown, the first group comprising load elements 22', the second comprising load elements 24', and the third comprising load elements 26'. For each of the load elements comprising group 22, a corresponding controlled switching device or thyristor 109 is connected thereto via fuses 113 which provides protection against overload. Each of such controlled switch devices or thyristors has a gate input 111. The load elements are connected to the thyristors. The thyristors 109 act as switches and are generally open, i.e., provide an open circuit between the DC output 103 from the power unit 101 and the load elements 22'. However when the proper gate signal is provided to each input 111 the controlled switching devices 109 will be energized and will provide a completed path between the DC output of the power unit 101 and the load elements 22'.

An identical arrangement is provided for the other groups of load elements. A second group of controlled switching devices 115 having a second group of gate inputs 117 are connected to load elements 24' via a second plurality of fuses 119. A third group of controlled switching devices or SCRs 121, having gate inputs 123 are connected to load elements 26' via a third plurality of fuses 124.

A plurality of capacitors 125 and resistors 127 are provided in parallel with each of the thyristors in groups 109, 115, and 121, for preventing rapidly changing voltage across each thyristor from causing improper conduction of the thyristors. The load elements 22', 24' and 26' are connected as shown to provide common return paths 129, 131, 133 and 135 including an additional set of fuses 137 and sampling resistors 139. The voltage across these resistors 139 are measured at points 141 by the reference current source in accordance with the teachings of the above-mentioned copending application Ser. No. 798,912. The sampling resistor 139 are then connected to form a common terminal 143 which is then returned to neutral or ground 145 depending upon the nature of the three-phase system. Protection output terminals 147 are connected at 148 to each of the load element branches. Protection output terminals 149 are connected to the branches having therein the load elements 24' at 150, and also protection output terminals 151 are connected at 155 for load elements 26'. The purpose of these output terminals will be described subsequently.

In the above described multiplexing arrangement individually operable controlled switching devices or thyristors were provided for each of the load elements, or lift coils in the case of a jack mechanism. In the case of the current regulation system described in related copending Pat. application Ser. No. 798,912, these individual controlled switching devices are already included in all of the load branches for the purpose of permitting individual lift coils to be separably connected or disconnected with a separate DC power source for the purposes of rod alignment. Proper alignment is required in a nuclear reactor to prevent unequal reactor heating resulting in hot spots with the nuclear reactor which in turn decreases the efficiency of the reactor. By disconnecting, for example, all of the controlled switching devices comprising groups 109, 115 and 121 except for one or more of such controlled switching devices which are then energized, it is possible to either insert or withdraw one rod one or more increments. The thyristors 109, 115 and 121 used in the multiplexing scheme for the lift power unit also provide blocking for circulating currents between the load elements where the load elements, as in the case of a nuclear reactor, are inductive.

There are instances when it is not necessary to control the current individually through each of the load elements. That is, it may be possible to use a single thyristor for supplying direct current to an entire group of load elements. In the case of a nuclear reactor control rod system such a multiplexing arrangement is adequate for supplying direct current to the movable coils of a plurality of rod control jack mechanisms.

Figure 3:
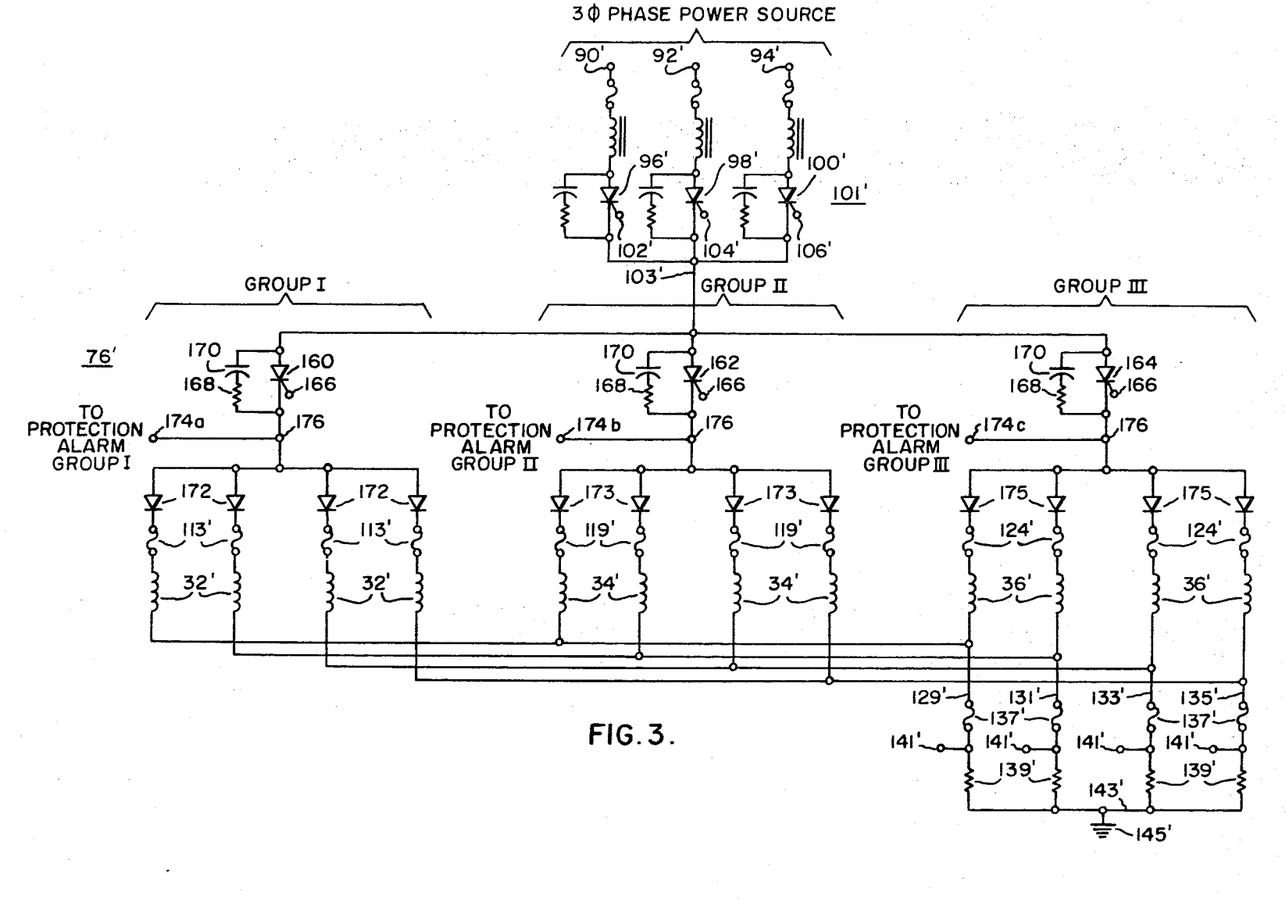
FIG. 3 is a schematic diagram illustrating in more detail another of the multiplexing embodiments shown in FIG. 1.

In FIG. 3, three-phase current from power source 40 (FIG. 1) is inputed to inputs 90', 92', and 94' of power unit 101'. Each phase is then rectified and regulated by thyristors 96', 98' and 100' by the application of a gate pulse at gate inputs 102', 104' and 106', respectively as previously discussed and in accordance with the teachings of the copending Pat. application Ser. No. 798,912. The resulting direct current is then sent through line 103' to multiplexing means 76' corresponding to multiplexing means 76 in FIG. 1. Connected to line 103' are three controlled switching devices, desirable thyristors 160, 162 and 164, each having a control gate 166. Resistors 168 and capacitors 170 in parallel with thyristors 160, 162 and 164 prevent thyristors 160, 162 and 164 from firing due to large transient voltages across the same.

A first group of load elements 32' are connected to the thyristor 160 through a plurality of fuses 113' and diodes 172. In a control rod jack mechanism these load elements would comprise the group of movable coils therein. Diodes 172 are included to prevent current circulation between load elements, where the load elements comprise inductive impedances such as those found in the jack mechanisms of a nuclear reactor rod control system. Similarly, the second group of load elements 34' are connected through a plurality of fuses 119' to a second set of diodes 173 to the controlled switching device 162 and the third group of load elements 36' are connected through a plurality of fuses 124' and diodes 175 to thyristor 164. The load elements comprising load element groups 32', 34', and 36' are connected to common lines 129', 131', 133' and 135', respectively, which include fuses 137' and monitoring resistors 139'. Each monitoring resistor 139' has a voltage measuring point 141', the purpose of which has been described in more detail earlier. Lines 129', 131', 133' and 135' are joined together at 143' and are then grounded or returned to neutral at 145'.

Since in the case of a jack mechanism it is not necessary to separately energize the individual movable coils, it is sufficient to provide single thyristors 160, 162 and 164 for each of the groups of movable coils 32', 34' and 36' respectively. In order to energize any of the three groups of load elements it is only necessary to provide a gate signal at the gate input 166 for the thyristor corresponding to the desired group of load elements to be energized. Furthermore, it is only necessary, as will be described in more detail later, to measure the voltage across each group of load elements for utilization in the protection circuits. Thus only three protection output terminals are required, 174a, 174b, and 174c, each of which is attached at 176 to the respective SCR devices as shown.

In addition to the protection circuit to be described subsequently, the above system includes an inherent safety mechanism in the event of the failure of the multiplexing scheme. If the multiplexing means fails and DC current is provided to each group of load elements more than one group rather than increasing the total current from the power unit 101 the effect is to divide the regular amount of current among the incorrectly multiplexed groups. This results since the currents are summed up at the common return paths 129, 131, 133 and 135 and it is these values which are measured for purposes of regulating the total current through the load element. Consequently there will be no net change measured at the voltage measuring points 141 when a failure occurs even though the current through individual groups of elements is decreased. That is, the control mechanism is unable to tell whether or not the right amount of current is at that time traveling through the proper load elements. Where, as in the case of a control rod jack mechanism, the load element is unable to function much below rated current, this insures that no further utilization of the load elements is possible. Thus the net effect on a rod control system is that the rods would be either frozen at their present position or drop into the reactor at any time in which the multiplexing means fails. In a nuclear reactor, where it could often be dangerous, for example, to withdraw more than one group of control rods at one time this provides an important safety feature.

Figures 4, 5:
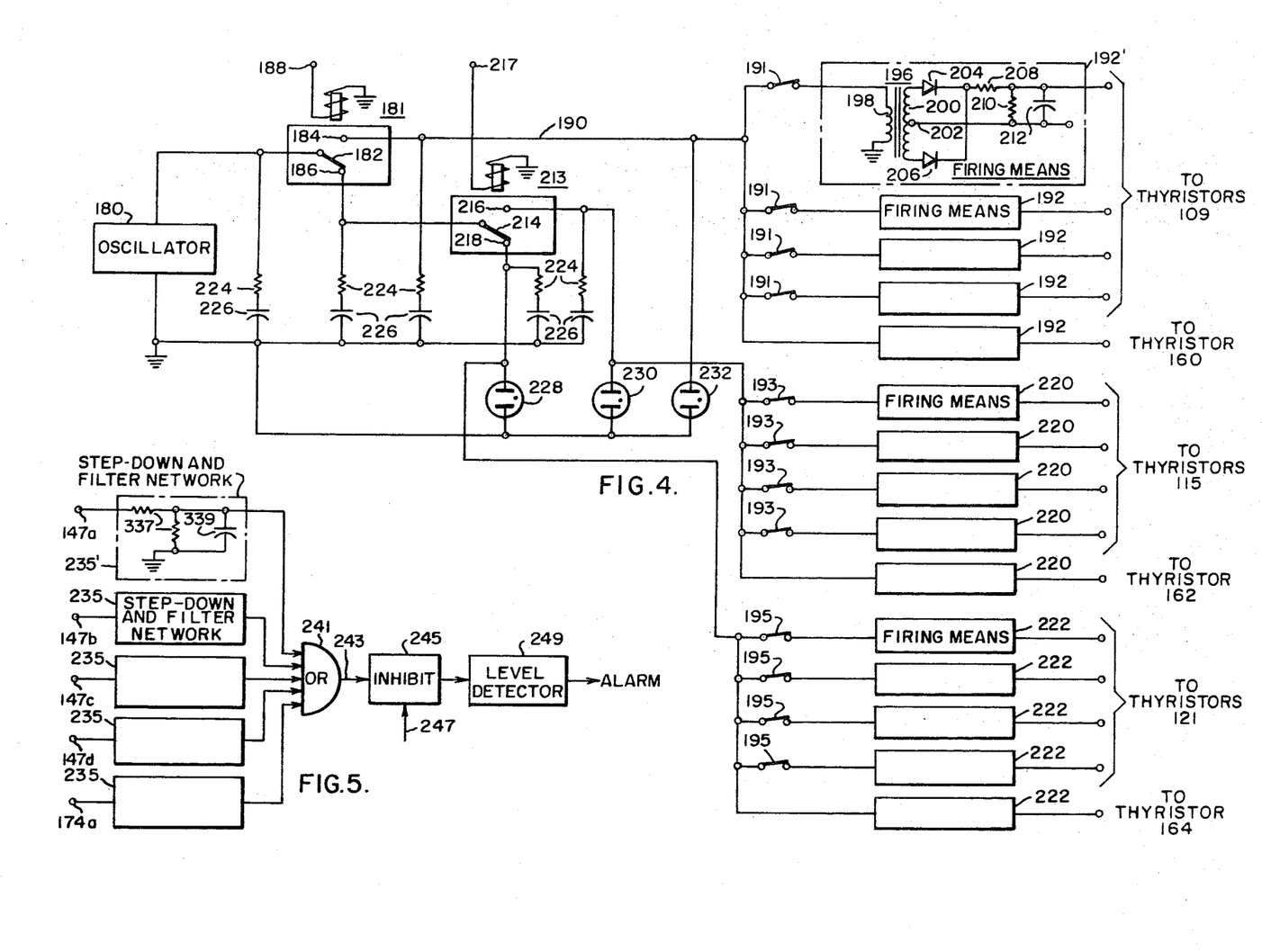
FIG. 4 is a schematic diagram illustrating means for providing multiplexing gate signals.
FIG. 5 is a block diagram of a protection circuit for providing an alarm signal in the event of a failure of the multiplexing system of the present invention.

The gate signals for the thyristors comprising multiplexing means 42 and 46 in FIG. 1 are shown in more detail in FIG. 4. An alternating voltage signal or oscillator 180 is connected to the moving contact 182 of a single pole, double throw switch 181. The switch 181 is desirably of the fast acting mercury wetted contact type. The position of the moving contact 182 between a first pole 184 and a second pole 186 is caused by the application of a signal at a terminal 188 which is electromagnetically coupled to change the moving contact position (not shown). If the signal is applied at 188 to cause the moving contact 182 to contact the first pole terminal 184, the oscillator will be connected via line 190 and four lift disconnect switches 191 to a first plurality of firing means 192. Details of one of the firing means 192' is shown but it should be understood that all of the firing means are identical with firing means 192'. Firing means 192' comprises an isolation transformer 196 having a primary winding 198 which is connected to the line 190. The secondary winding 200 has a center tap terminal 202 and diodes 204 and 206 which are arranged as shown to provide a direct current rectification from the output of the secondary winding 200. Filtering is provided by resistor 208 and capacitor 212. Resistor 210 provides a path for thyristor leakage current. The rectified output may then be applied to one of the thyristors comprising the first group 109 of controlled switching devices shown in FIG. 2. Likewise, the outputs from the remaining first plurality of firing means 192 are connected to the line 190 and are sent to provide gate signals to the remaining thyristors 109 of the first group of load elements 22' in FIG. 2. One isolation means output is used to gate the thyristor 160 shown in FIG. 3 for purposes of energizing all of the load elements 32'.

The second pole terminal 186 is connected to the moving contact 214 of a second single-throw, double-pole switch 213 having a first pole terminal 216 and a second pole terminal 218. The position of the moving contact 214 is determined by the polarity of a signal provided at terminal 217 which is electromagnetically coupled with the moving contact 214. The first pole terminal 216 is connected through four lift disconnect switches 193 to a second plurality of firing means 220, each of which is identical in construction to the aforesaid firing means 192'. If the moving contact 182 of the first switch 181 is in contact with the second pole terminal 186 and if the moving contact 214 of the second switch 213 is connected to the first pole terminal 216, it can be seen that the output from the oscillator 180 will thereby be connected via the two switches 181 and 213 to the second plurality of firing means 220. The outputs from the plurality of firing means 220 are connected to the gate inputs of thyristors 115 shown in FIG. 2 corresponding to the second group of load elements 24' and to thyristor 162 in FIG. 3 corresponding to the second group of movable load elements 34'. Thus, when the switches are in the positions just described these thyristors will be energized causing load current to flow through load elements 24' and 34'.

If the moving contact 214 of the second switch 213 is changed to contact the second pole contact 218 the oscillator 180 will be connected through disconnect switch 195 to firing means 222. Four of these firing means provide gate signals to the thyristor 121 in FIG. 2 and to the thyristor 164 in FIG. 3.

Resistors 224 and capacitors 226 are connected as shown for protecting the contacts of switches 181 and 213. In order to provide an indication to an operator which of the groups of load elements are being activated indicator lamps 228, 230 and 232 are provided. Indicating lamp 228 is connected so that it will be illuminated only when the third group of load elements 26' and 36' are connected with the direct current source. Similarly, indicator lamp 230 will be illuminated only when load elements 24' and 34' are connected and indicating lamp 232 will be illuminated only when the load elements 22' and 32' are energized.

It is desirable in the present multiplexing system to include an alarm system to indicate whether or not the multiplexing operations have been carried out successfully. More particularly, it is desirable to see and check whether or not the groups of load elements which are supposed to be deenergized are in fact deenergized. FIG. 5 illustrates an alarm system for the first groups of load elements 22' and 32' shown in FIGS. 2 and 3. More particularly it is therein illustrated an alarm system to indicate whether there is direct current flowing through the load elements 32' in FIG. 3 and the load elements 22' in FIG. 2 at a time when no current is called for through those elements. A similar alarm system will be provided for each of the other groups of load elements 24' and 34' and 26' and 36'.

Terminals 147 in FIG. 2 are broken down into terminals 147a, 147b, 147c and 147d in FIG. 5 corresponding to each terminal for each of the load element branches so that the current through each branch may be monitored. Similarly the load current through the load element 32' in FIG. 3 is monitored at the protection output terminal 174a. In the case of load elements 32' in FIG. 3 it is only necessary to provide one current sampling input since there is the possibility of only the failure of the single thyristor 160 instead of the plurality of thyristors 109 for the first group of load elements 22' in FIG. 2. The signals received at each of the inputs 147a, 147b, 147c, 147d and 174a are then stepped down and filtered by stepdown and filtering means 235, each of which is identical and each consists of a pair of resistors 237 and capacitor 239 in stepdown and filtering means 235, each of which is identical and each consists of a pair of resistors 237 and capacitor 239 in stepdown and filtering means 235. The stepped down and filtered signal representative of the voltage across the respective load coils is then gated at analog OR gate 241. Analog OR gate 241 is well known in the art and has the property of permitting the largest valued input signal to be transmitted through to the output 243. For example, if a large voltage is sensed at the input 147b, OR gate 241 would permit an output at 243 corresponding to the value of the signal filtering and stepdown means 235. OR gate 241 should be distinguished from a binary OR gate which provides only bilevel output signals whereas analog OR gate 241 outputs a signal at 243 which will vary depending upon the value of the largest input at the OR gate 241.

The output 243 of the OR gate is then connected to an inhibit circuit 245 having an inhibit input 247 to allow the alarm system to be disabled during the time in which the preset multiplexing system is providing sequenced direct current to that particular group of load elements. During that time, current flows through each of the load elements and it would be undesirable, and in fact unworkable, for an alarm signal to be given at that time. Thus, if load element groups 22' and 32' are to be energized, input 247 would also be energized thereby causing the signal from the OR gate to be diverted from level detector 249. Level detector 249 is responsive to the output from the inhibit circuit 245 to provide an alarm signal whenever the value from the OR gate 241 exceeds a maximum predetermined value. It can be seen that if any of the input signals at 147a, 147b, 147c, 147d or 174a exceed the predetermined value resulting in a current through groups or individual load elements other than the proper ones, an alarm signal will be provided from the level detector 249. This signal may then be used to stop further operation of the faulty equipment and to alert an operator to indicate to him that there is a fault in the multiplexing system as well as to energize a lamp in proximity with the multiplexing apparatus so that the faulty apparatus may be identified quickly.

In the operation of a nuclear rod control system incorporating the present invention it is necessary, when one group of rods are inserted or withdrawn, to energize the stationary coils in the jack mechanisms of the remaining groups of rods to hold these rods at their present position. Referring to FIG. 1, if the group 1 control rod mechanisms are to be energized, i.e., if the stationary group 1 coils 12, the movable group 1 load coils 32, and the lift group 1 coils 22 are sequentially energized according to a predetermined current sequence, it is necessary to maintain the group 2 and group 3 stationary coils, groups 14 and 16, respectively, so as to prevent dropping the control rods corresponding to those jack mechanisms into the nuclear reactor.

Figure 6A:
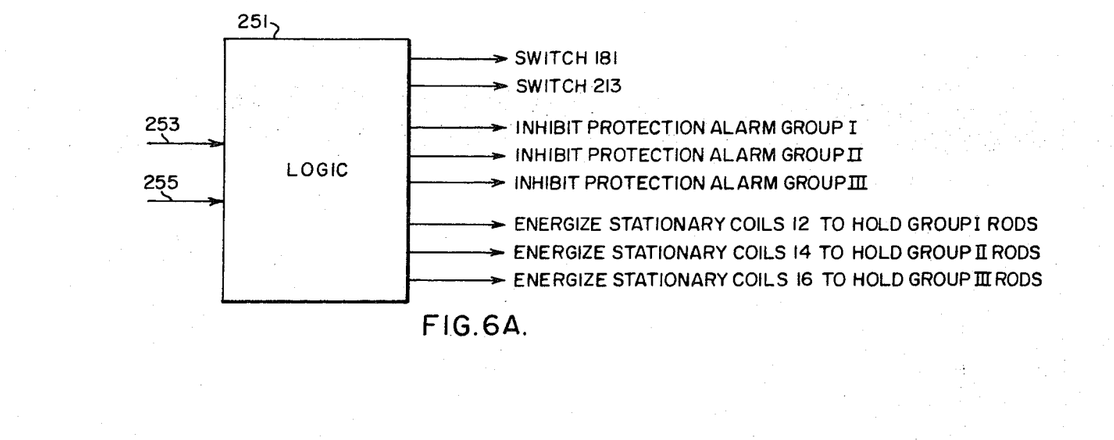
FIGS. 6A and 6B illustrate the requirements of a control system to carry out the desired operation of the present multiplex system.

In FIG. 6A, logic means 251 is provided having a first input 253 and a second input 255 for carrying out the control functions necessary to operate the multiplexing system including the protection alarm circuits. Inputs 253 and 255 are responsive to binary input signals. When a particular group of load elements are to be energized several control functions must be carried out by the logic means 251. First, the two relays 181 and 213 shown in FIG. 4 must be energized in accordance with the desired group of load elements to be energized. Secondly, the protection alarm system for that group of load elements to be energized must be disabled so that an alarm signal will not be improperly given. Finally, in the example of a nuclear rod control system the stationary coils in those groups of jack mechanisms not to be sequenced must be energized to prevent the dropping of rods into the nuclear reactor.

Figure 6B:
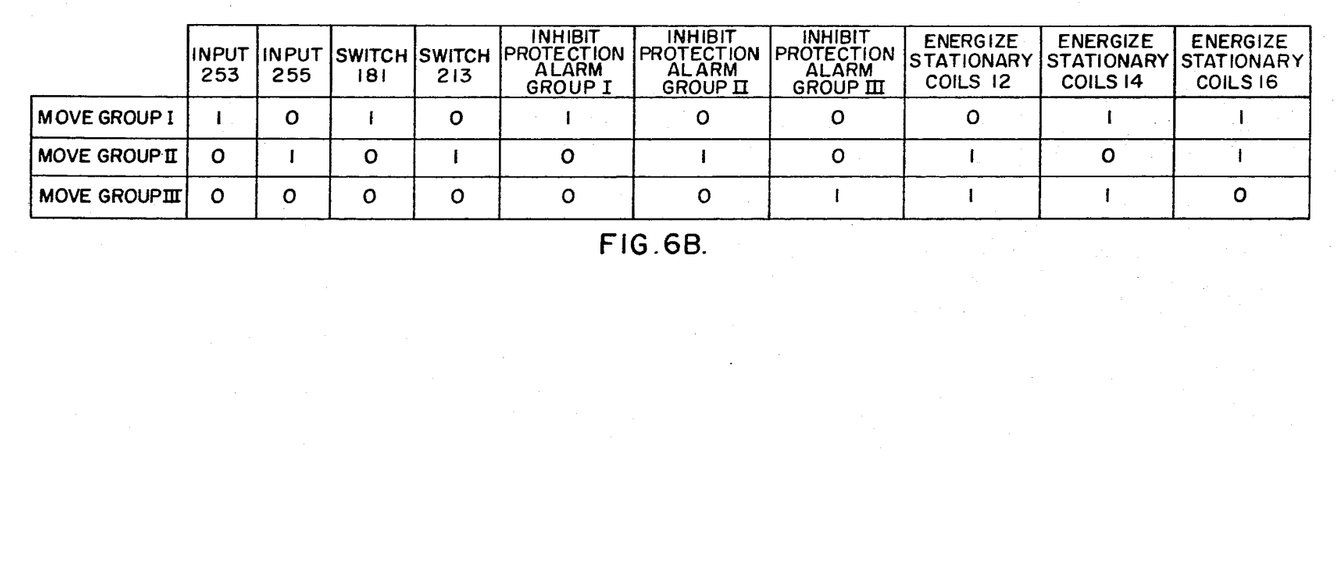

Logic means 251 desirably comprises a combination of logic gates in accordance with logical design techniques now very familiar in the digital circuitry art. The functions of the logic means 251 can best be understood by reference to FIG. 6B. For example, if it is desired to move a first group of control rods in a nuclear reactor, i.e., if it is required that the jack mechanism coils of the first control rod group be energized according to a predetermined direct current sequence, then a binary one signal is applied at the input 253 to logic circuit 251 and a binary zero signal to input 255. This will cause relay 181 to contact pole terminal 184 which in turn will permit the direct current sequence to be applied to the load elements corresponding to the stationary coils 12, the lift elements 22 and the movable elements 32 in FIG. 1. At the same time a binary signal is provided to inhibit the protection circuit corresponding to the group 1 coils. No such inhibiting signal is provided to the group 2 and group 3 protection circuits. Further, it is required to provide a binary signal to inhibit the sequencing signals and provide holding signals to stationary group 14 elements and stationary group 16 coils to prevent these control rods from being dropped. To move the second group of the load elements a binary one is provided at the input 255 of logic means 251 and a zero at input 253. Relay 213 is activated accordingly with a binary one signal and a binary zero signal to relay 181 moving its armature accordingly. The protection for group 2 load elements is inhibited with a binary one signal while the protection alarm circuits for the first and third groups remain uninhibited. The stationary windings for groups 1 and 3 jack mechanisms are inhibited and provided with a steady state current to maintain the control rods in a stationary position. Finally, to move the third group of load elements corresponding to the stationary coils 16, lift coils 26, and movable coils 36, zero binary inputs are provided at inputs 253 and 255 of logic circuit 251. Thus both relays 181 and 213 are in the positions shown in FIG. 4. The alarm protection circuit for the group 3 coils is inhibited. Also the stationary coils for groups 1 and 2, i.e., group 12 and group 14, are inhibited so as to prevent droppage of the control rods.

Disconnect switches 191, 193 and 195 (FIG. 4) may be utilized to realign rods in a rod control system. Note that these switches are only connected with those firing means 192, 220 and 222 corresponding to thyristors 109, 115 and 121. These thyristors are used to individually energize the lift coils 22', 24' and 26' (FIG. 2). Should, for example, one of the rods corresponding to lift coils 22' get out of alignment, realignment may be accomplished as follows. The corresponding lift disconnect switch 191 is opened. The remaining thyristors 109 are then energized by the aforesaid multiplexing apparatus and the lift coils except for the coil corresponding to the misaligned rod, are then provided with the current to withdraw or insert the remaining rods so as to realign all of the rods.

Note that no disconnect switches are provided for firing means 192, 220 and 222 corresponding to thyristors 160, 162 and 164, which are used in multiplexing the movable coils. Switches are not required here, nor are they required for the stationary coils, since during the aforesaid realignment procedure there is no reason to stop the functions performed by the stationary and movable coils, since these unlike the lift coils, do not cause either the insertion or withdrawal of the rods.

While there have been shown and described what are at present considered to be the preferred embodiments of the invention, modifications thereto will readily occur to those skilled in the art. It is not desired therefore that the invention be limited to the specific arrangement shown and described and it is intended to cover all such modifications as fall within the true spirit and scope of the invention.

I claim:

1. In a system for providing current from a three-phase power source to a plurality of groups of load elements comprising:
   current reference source means operable to provide a plurality of predetermined operational reference current signals;
   first means for alternately providing a first predetermined current sequence to each load element of a first plurality of groups of load elements comprising:
      first power unit means comprising a rectifying means for converting the three-phase power to direct current having a value in accordance with a first predetermined reference current signal provided by said reference current source,
      first multiplexing means for separably connecting each load element within the group of load elements to be energized to said first power unit means;
   second means for alternately providing a second predetermined direct current sequence to each load element of each of a second plurality of groups of load elements comprising:
      second power unit means comprising a rectifying means for converting the three-phase power to direct current having a value in accordance with a second predetermined reference current signal provided by said reference current source;
      second multiplexing means for connecting an individual group within said second plurality of groups of load elements to said second power unit means so as to energize all of the load elements within the connected group.

2. A system as in claim 1 including means for providing direct current to each of a plurality of additional groups of load element comprising a plurality of power unit means, corresponding in number to the plurality of additional groups of load elements, each comprising rectifying means for converting the three-phase power to direct current in accordance with a predetermined reference current signal provided for each group of load elements by said reference current source and whereas each load element within each group of additional load elements is energized by the direct current according to the predetermined reference current signals for each group.

3. A system as in claim 1 including means for providing an alarm signal if more than one group of said first plurality of groups of load elements is energized at one time or if more than one group of said second plurality of groups of load elements is energized at one time.

4. A system as in claim 1 wherein said first multiplexing means comprises:
   a first plurality of normally open controlled switching devices, corresponding in number to the total number of load elements within said first plurality of groups of load elements each having a gate input, and wherein each of said controlled switching devices is serially connected with each load element therein;
   means for alternately providing gate signals to the gate inputs of groups of said controlled switching devices associated with each of the groups of said first plurality of groups of load elements to close the same, whereby each group within said first plurality of load groups is alternately connected to the rectifying means of said first power unit.

5. A system as in claim 1 wherein said second multiplexing means comprises:
   a second plurality of normally open controlled switching devices corresponding in number to the number of groups in said second plurality of groups of load elements, each having a gate input, and wherein each anode is connected to the rectifying means of said second power unit means and wherein each of said controlled switching devices is connected to the load elements of one group within said second plurality of groups of load elements;
   means for alternately providing gate signals to the gate inputs of each of the controlled switching devices within said second plurality of controlled switching devices to close the same, whereby each group within said second plurality of load groups is alternately connected to the rectifying means of said second power unit.

6. A system as in claim 4 wherein the means for alternately providing gate signals comprises:
   an alternating current signal source;
   means for selectively coupling said alternating current signal source with the gate inputs of said controlled switching devices associated with each of the groups within said first plurality of groups of load elements, comprising:
      a plurality of isolation transformers in accordance with the number of controlled switching devices within said first plurality of controlled switching devices, each having a primary winding and a secondary winding:
      a plurality of rectifying means each connected between the secondary winding of each of said isolation transformers and the gate inputs of said first plurality of controlled switching devices;
      switching means for alternately connecting said alternating current signal source with the primary windings of said isolation transformers associated with each of the groups of load elements within said first plurality of load elements wherein a rectified gate signal is provided to the gate inputs of said controlled switching devices to close the same and energize the desired group of load elements.

7. A system as in claim 5 wherein the means for alternately providing gate signals comprises:
   an alternating current signal source;
   means for selectively coupling said alternating current signal source with the gate inputs of said controlled switching device associated with each of the groups within said second plurality of groups of load elements, comprising:
      a plurality of isolation transformers in accordance with the number of controlled switching devices within said second plurality of controlled switching devices, each having a primary winding and a secondary winding;
      a plurality of rectifying means each connected between the secondary winding of each of said isolation transformers and the gate inputs of said second plurality of controlled switching devices;
      switching means for alternately connecting said alternating current signal source with the primary windings of said isolation transformers associated with each of the groups of load elements within said second plurality of load elements wherein a rectified gate signal is provided to the gate inputs of said controlled switching devices to close the same and energize the desired group of load elements.

8. A system as in claim 3 wherein the alarm providing signal means comprises;
   a first plurality of voltage sensing means, each responsive to the current through one load element in said first plurality of groups of load elements and operable to provide a voltage signal corresponding to the actual current through the load element;
   a second plurality of voltage sensing means, each responsive to the current through one group of said second plurality of groups of load elements to provide a voltage signal corresponding to the actual current through the group of load elements;
   a plurality of gate means, each of which is responsive to the voltage signals from a group of said first plurality of current sensing means corresponding to each group of said first plurality of groups of load elements and to one of said second plurality of current sensing means, and which is operable to provide an output signal corresponding to the value of the highest current signal;
   level detection means responsive to the output signal operable to provide an alarm signal whenever said output signal exceeds a predetermined value; and
   inhibiting means for disabling said alarm signal providing means for the group of load elements being energized.

9. Apparatus as in claim 4 for use in a nuclear reactor rod control system wherein said load elements comprise devices for withdrawing and inserting rods within a nuclear reactor, including a direct current power source, and wherein said first plurality of controlled switching devices may be separably controlable for providing direct current to said devices for aligning said rods.

10. Apparatus as in claim 1 wherein said current reference source is responsive to the total current through corresponding elements within each of said first plurality of groups of load elements in providing regulation thereof.

11. Apparatus as in claim 1 wherein said current reference source is responsive to the total current through corresponding elements within each of said second plurality of groups of load elements in providing regulation thereof.

12. Apparatus as in claim 2 wherein said load elements comprise a plurality of mechanisms for moving a plurality of control rods within a nuclear reactor; and
   means for preventing more than one of said lesser pluralities of said mechanisms from being operable at the same time.